United States Patent Office 3,252,905
Patented May 24, 1966

3,252,905
POLYAMIDE BEARINGS
Paul R. Schaeffer, Reading, Pa., assignor, by mesne assignments, to The Polymer Corporation, a corporation of Pennsylvania
No Drawing. Filed Sept. 7, 1962, Ser. No. 222,221
2 Claims. (Cl. 252—12)

This invention relates to synthetic bearing materials having reduced coefficients of friction and improved properties of wear. More particularly this invention relates to methods and means for incorporating lubricant fillers in certain polyamides and the products thereby obtained.

It has been found that the addition of certain liquid lubricants to various polyamides results in new and useful bearing materials that have low coefficient of friction, improved resistance to wear and may be employed as bearings at higher loadings and operating speeds. While this invention is broadly applicable to all fiber-forming polyamides, it is particularly useful with respect to polylactams that are prepared by low temperature anionic polymerization processes. As used herein, "low temperature" polymerization refers to polymerization processes that can, if desired, be carried out above the melting point of the monomer, but below the melting point of the polymer. As this type of polymerization enables casting articles simultaneously with the polymerization, a uniform dispersion of the lubricant fillers throughout such articles can be achieved by mixing the filler and monomer together immediately prior to and/or simultaneously with the beginning of the polymerization. On the other hand, uniform dispersions of these lubricant fillers are difficult to achieve in articles, if they are added to polyamides subsequent to polymerization. Even if good dispersion of the fillers in the polymer is obtained, it is difficult to maintain such dispersion during subsequent shape formation, such as injection molding and extrusion, which necessarily entails melting of the polyamide.

It is an object of this invention to provide polyamide materials particularly useful as bearings.

It is another object of this invention to provide polyamide materials having low coefficients of friction.

A further object is to provide polyamide materials useful in fabricating low friction bearings that are capable of operation under high pressure and velocity loadings.

Yet another object of this invention is to provide bearings comprised of polyamide materials which bearings exhibit improved resistance to wear.

These and other objects of this invention are achieved by mixing selected lubricant fillers throughout polymerizable lactams and/or mixtures of lactams, and then polymerizing the lactams to form solid polyamide shapes containing uniform distributions of such fillers.

The low temperature anionic polymerization of lactams referred to above is disclosed, for example, in U.S. Patents 3,015,652; 3,017,391; 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly acid anhydrides generate organic acids in the system which then require sufficient anionic catalyst to neutralize the organic acid in addition to the amount desired to function in the polymerization reactions.

The lubricant fillers with which this invention is concerned may best be defined in terms of their physical and chemical properties. The essential properties that these lubricant fillers must have are as follows:

A. *Melting point.*—The lubricant fillers of this invention have a low melting point and preferably one below that of the monomeric lactam to which they are added. This facilitates the prepartion of uniform mixtures of lubricant filler and monomer simply by mixing the two liquids together. Also, the filler material often is more effective as a lubricant in a bearing if it is softened or melted at the operating temperature and pressure of the bearing.

B. *Vapor pressure.*—in addition to a low melting point, the lubricant fillers should have a low vapor pressure at bearing operating temperatures. If the vapor pressure is high at bearing operating temperatures, the lubricant may soon be lost from the bearing by volatilization.

C. *Lubricating properties.*—As is generally true of good lubricants, the lubricant fillers of this invention should be capable of "wetting out" bearing surfaces.

D. *Chemical properties.*—As has been previously discussed, it is desired that the lubricant fillers be added to the monomeric lactams prior to polymerization. For this reason the fillers should not chemically interfere with or poison the polymerization reaction. While it may quite generally be said that oxidants and compounds containing active hydrogen and hydroxyl groups will interfere with the discussed anionic polymerization processes, the compatibility of a given filler with the reaction must be determined with respect to the specific catalyst and promoter used in polymerization as well as with respect to the quantity of filler added.

Within the above-defined limits, many compounds can be selected which will perform satisfactorily as lubricant fillers within the scope of this invention. To indicate the broad range of these materials, the following lubricant fillers may be mentioned by way of example: mineral oil, silicone oils, halogenated biphenyls, didecyl phthalate, polybutene, metallic fatty acid esters and butyl stearate. Particularly desirable in the practice of this invention are ketones derived from fatty acids such as 18-pentatriacontanone and 12-tricosanone.

In the following examples lubricant fillers were added to epsilon-caprolactam (percents are given by weight) and thoroughly mixed therewith. The caprolactam and filler mixture was raised to about 160° C. and polymerization was initiated using about 1/200 mole of a sodium hydride catalyst and 1/200 mole of a toluene diisocyanate promoter. In less than 2 minutes a solid shape of polycaprolactam was formed that contained the lubricant filler uniformly dispersed throughout.

The term "PV" in the below examples refers to a standard measurement for defining loads on bearing surfaces. It is a product of the pressure exerted on a bearing surface in pounds per square inch and the relative velocity between the bearing surfaces in feet per minute.

The friction and wear data were obtained by use of a thrust washer test. Washers were machined from the filled polycaprolactam samples and were rotated against a metal plate while a force was applied to the washer parallel to its axis. The coefficient of friction was determined by measuring the resultant torque on the metal plate and the wear data was determined by weight loss. The weight loss is given in mils per 1000 hours.

The chlorinated biphenyl filler of Example VIII is sold under the name Aroclor by Monsanto Chemical Company.

| Example | Lubricant filler | PV load | Coefficient of friction | Wear |
|---|---|---|---|---|
| I | None | 500 | 0.21–0.61 | 25 |
| II | do | 1,000 | 0.34–0.90 | 50 |
| III | do | 2,000 | 0.39–0.94 | 110 |
| IV | do | 5,000 | (¹) | (¹) |
| V | 7% Didecyl phthalate | 5,000 | 0.21–0.68 | 180 |
| VI | Mineral Oil | 5,000 | 0.19–0.34 | 36 |
| VII | do | 10,000 | 0.19–0.69 | 110 |
| VIII | 7% Polybutene | 5,000 | 0.34–1.0 | 270 |
| IX | 7% Chlorinate biphenyl | 5,000 | 0.15–0.26 | 25 |
| X | 7% Stearone | 1,000 | 0.21–0.26 | Nil |
| XI | do | 2,000 | 0.19–0.21 | Nil |
| XII | do | 5,000 | 0.08–0.25 | 10 |
| XIII | do | 10,000 | 0.15–0.17 | 6 |
| XIV | do | 20,000 | 0.13–0.15 | 16 |
| XV | 7% Laurone | 500 | 0.11–0.15 | Nil |
| XVI | do | 1,000 | 0.06–0.14 | Nil |
| XVII | do | 2,000 | 0.17–0.25 | 3 |
| XVIII | do | 5,000 | 0.12–0.20 | 4 |
| XIX | do | 10,000 | 0.09–0.24 | 4 |
| XX | do | 20,000 | 0.11–0.80 | 43 |

¹ Melted out.

I claim:
1. An improved bearing material comprised of the polymerization product of a higher lactam containing a uniform distribution of 18-pentatriacontanone.
2. An improved bearing material comprised of the polymerization product of a higher lactam containing a uniform distribution of 12-tricosanone.

References Cited by the Examiner

UNITED STATES PATENTS

| | | | |
|---|---|---|---|
| 2,849,414 | 8/1958 | Stott | 252—12 X |
| 2,855,377 | 10/1958 | Stott | 252—12 X |
| 2,975,128 | 3/1961 | Stott | 252—12 |
| 3,017,391 | 1/1962 | Mottus et al. | 260—78 |
| 3,017,392 | 1/1962 | Butler et al. | 260—294.7 |
| 3,126,339 | 3/1964 | Stott | 252—12 |

FOREIGN PATENTS

| | | |
|---|---|---|
| 698,611 | 10/1953 | Great Britain. |
| 767,820 | 2/1957 | Great Britain. |

OTHER REFERENCES

"Nylon as a Bearing Material," by Akin, October 1949, in Modern Plastics.

DANIEL E. WYMAN, *Primary Examiner.*

JOSEPH R. LIBERMAN, *Examiner.*

I. VAUGHN *Assistant Examiner.*